United States Patent
Hatch et al.

(10) Patent No.: US 6,263,376 B1
(45) Date of Patent: *Jul. 17, 2001

(54) GENERIC RUN-TIME BINDING INTERPRETER

(75) Inventors: Charles A. Hatch, Springville; Kamika L. Fisher, Orem; Brent W. Thurgood, Spanish Fork; Robert Jeffrey Vincent, West Jordan; Timothy W. Mullins, Orem, all of UT (US)

(73) Assignee: Novell, Inc., Provo, UT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/806,505

(22) Filed: Feb. 24, 1997

(51) Int. Cl.[7] .............................. G06F 9/00; G06F 9/45; G06F 9/46
(52) U.S. Cl. ................................ 709/310; 717/8; 707/4
(58) Field of Search .......................... 395/704, 183.14, 395/708; 714/38, 25; 717/8; 709/310–332; 707/1–9

(56) References Cited

U.S. PATENT DOCUMENTS

| | | |
|---|---|---|
| 4,937,864 | 6/1990 | Caseiras et al. . |
| 5,075,847 | 12/1991 | Fromme . |
| 5,157,779 | 10/1992 | Washburn et al. . |
| 5,193,178 | 3/1993 | Chillarege et al. . |
| 5,212,792 | 5/1993 | Gerety et al. . |
| 5,218,605 | 6/1993 | Low et al. . |
| 5,335,342 | 8/1994 | Pope et al. . |
| 5,335,343 * | 8/1994 | Pope et al. .............. 714/38 |
| 5,339,430 | 8/1994 | Lundin et al. . |
| 5,343,409 | 8/1994 | Satterfield et al. . |
| 5,357,452 | 10/1994 | Pio-di-Savoia et al. . |
| 5,359,546 | 10/1994 | Hayes et al. . |
| 5,365,606 | 11/1994 | Brocker et al. . |

(List continued on next page.)

OTHER PUBLICATIONS

Marc J. Balcer, William M. Hasling and Thomas J. Ostrand, Automatic Generation of Test Scripts from Formal Test Specifications, 1989 ACM SIGSOFT '89 (TAV).

Michael M. Gorlick and Rami R. Razouk, Using Weaves for Software Construction and Analysis, 1991 IEEE, 13th International Conference on Software Engineering.

Brian W. Beach, Connecting Software Components with Declarative Glue, 1992 ACM, 14th International Conference on Software Engineering.

Daniel A. Norton, Developing Automated Testing Procedures with Microsoft® Test and TestBasic Scripts, Microsoft Systems Journal, Nov. 1992, pp. 63–76.

Ram Chillarege, Software Probes and a Self–Testing System—for Failure Detection and Diagnsis, Jan. 13, 1993, Research Report, IBM Research Division.

Peter A. Vogel, An Integrated General Purpose Automated Test Environment, ACM–ISSTA '93–6/93.

(List continued on next page.)

*Primary Examiner*—Majid Banankhah
*Assistant Examiner*—P Caldwell
(74) *Attorney, Agent, or Firm*—Dinsmore & Shohl LLP

(57) ABSTRACT

A method for calling and executing a program is disclosed. A command having zero or sequentially independent parameters values is received. The command corresponds to a program with a number of recognized parameters equal to or greater than the number of parameter values in the command. The parameter values are parsed based at least in part on demarcations in the command. The parameter values are associated with the corresponding parameters recognized by the program. Any parameter which did not have corresponding parameter values are set to default values. The program is executed to perform one or more tasks using the parameter values and the default values.

28 Claims, 4 Drawing Sheets

U.S. PATENT DOCUMENTS

| | | | |
|---|---|---|---|
| 5,371,883 | * | 12/1994 | Gross et al. ............................ 714/38 |
| 5,410,681 | | 4/1995 | Jessen et al. . |
| 5,410,703 | | 4/1995 | Nilsson et al. . |
| 5,414,836 | | 5/1995 | Baer et al. . |
| 5,421,004 | * | 5/1995 | Carpenter et al. ...................... 714/25 |
| 5,423,023 | | 6/1995 | Batch et al. . |
| 5,428,792 | | 6/1995 | Conner et al. . |
| 5,465,363 | | 11/1995 | Orton et al. . |
| 5,475,843 | | 12/1995 | Halviatti et al. . |
| 5,490,249 | | 2/1996 | Miller . |
| 5,493,682 | | 2/1996 | Tyra et al. . |
| 5,513,316 | | 4/1996 | Rodrigues et al. . |
| 5,519,866 | | 5/1996 | Lawrence et al. . |
| 5,530,861 | | 6/1996 | Diamant et al. . |
| 5,542,043 | | 7/1996 | Cohen et al. . |
| 5,544,310 | | 8/1996 | Forman et al. . |
| 5,546,584 | | 8/1996 | Lundin et al. . |
| 5,546,595 | | 8/1996 | Norman et al. . |
| 5,548,726 | | 8/1996 | Pettus . |
| 5,555,418 | | 9/1996 | Nilsson et al. . |
| 5,561,769 | | 10/1996 | Kumar et al. . |
| 5,590,330 | | 12/1996 | Coskun et al. . |
| 5,659,547 | | 8/1997 | Scarr et al. . |
| 5,745,767 | * | 4/1998 | Rosen et al. .......................... 395/704 |
| 5,754,755 | * | 5/1998 | Smith, Jr. .......................... 395/183.14 |
| 5,761,408 | * | 6/1998 | Kolawa et al. .................. 395/183.14 |
| 6,091,897 | * | 7/2000 | Yates et al. ........................... 395/708 |

OTHER PUBLICATIONS

Kuniyasu Suzaki, Takio Kurita, Hitoshi Tanuma and Satoshi Hirano, Adaptive Algorithm Selection Method (AASM) for Dynamic Software Tuning, 1993 IEEE, 17th Annual International Computer Software & Application Conference.

James R. Larus and Thomas Ball, Rewriting Executable Files to Measure Program Behavior, Software—Pratice and Experience, vol. 24(2), 197–198 (Feb. 1994).

Ernst Siepmann and A. Richard Newton, TOBAC: A Test Case Browser for Testing Object–Oriented Software, ACM–ISSTA '94.

F. Joe Lin, Specification and Validation of Communications in Client/Server Models, 1994 IEEE, 1994 International Conference on Network Protocols.

Tim Parker, Automated Software Testing, Jan. 1995, Unix Review, pp. 49–56.

James R. Larus and Eric Schnarr, EEL: Machine–Independent Executable Editing, 1995 ACM SIGPLAN '95 Conference on Programming Language Design and Implementation (PLDI).

Michael D. Maggio, Automated Software–Testing Scripts, 12/95 Unix Review, pp. 43–53.

Nancy S. Eickelmann and Debra J. Richardson, An Evaluation of Software Test Environment Architectures, 1996 IEEE, 18th International Conference on Software Engineering.

Talila Baron, Latest Testing tools focus on client/server systems, PC Week, Jun. 17, 1996.

Yun Jiang, Masayoshi Aritsugi and Akifumi Makinouchi, Integrating Parallel Functions into the Manipulation for Distributed Persistent Objects, 1996 IEEE 20th Annual International Computer Software & Appliations Conference.

Stephen R. Quinn and Muralidhar Sitaram, Testing, Testing, BYTE 9/96.

Tim Parker, Two Approaches to Debugging, 3/97 Unix Review.

ScriptEase™ WebSrver Edition Advertisement in Windows Developer's Journal, Mar. 1997.

Downloaded text form http://www.nombas.com, Mar. 5, 1997.

Bob Friesenhahn, Expect Offers Unix Scripting, 4/97 BYTE.

* cited by examiner

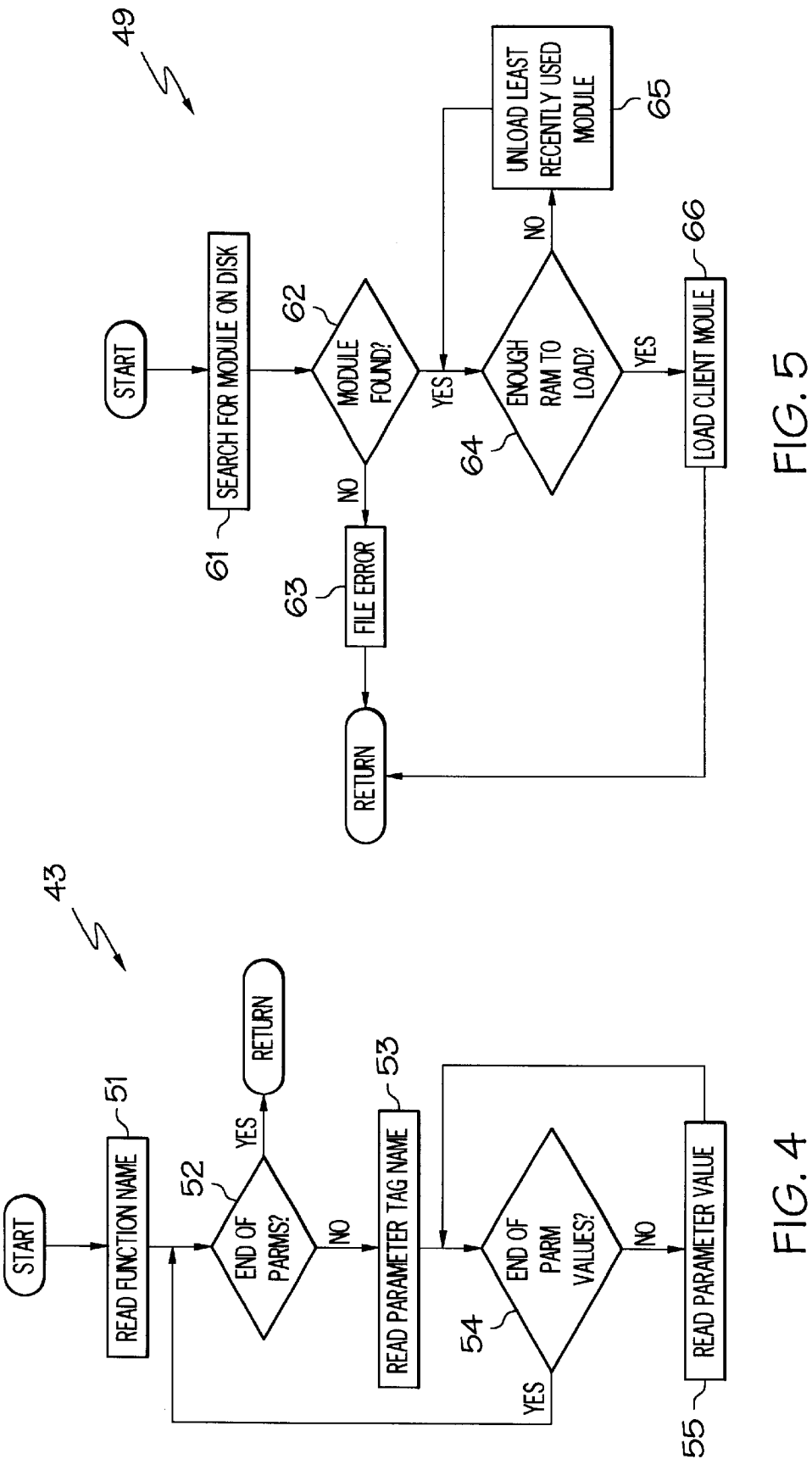

GENERIC RUN-TIME BINDING INTERPRETER

TECHNICAL FIELD

The present invention relates generally to a method and apparatus for implementing programs, and will be specifically disclosed as a method and apparatus for calling and executing functions.

BACKGROUND

Computers have become an integral part of modern society. In fact, it is hard to image a day where we are not touched by computer related technology. Many applications for computers require a gateway or interface for humans and computers to interact. Through computer interfaces, humans can receive information processed by computers and/or instruct computers to perform tasks. The hardware aspect of interfaces include common input/output devices, such as keypads, pointer devices, monitors, printers, microphones, speakers, etc. Behind hardware is an electronic aspect which is driven and controlled by software.

The software that instructs a computer or microprocessor to perform tasks is called a program. One type of program is a function, which usually performs a particular service or a series of discrete tasks. For instance, a function named DISPLAY could instruct a computer to display a value on a monitor. Functions are typically compiled within a larger program or are compiled within a library or collection of functions. Generally, a function is invoked by calling the function. When a function is called, parameter values are typically passed to the function to tailor the task that the function will perform. For instance, the DISPLAY function could be passed the value MYNAME (a string containing my name), which would result in the computer displaying that particular name on the screen. Parameter values usually come in a variety of different types, such as pointers, integers, strings, etc. While some functions have no parameters (i.e. no parameter values can be passed to the function), many functions have a variety of parameters to tailor the execution of the tasks therein.

Languages typically require function calls to be in a specific syntax for the function to work properly. Traditionally, parameter values must be listed in a specific order so that the function will know which parameter in the function will be associated with which value. A function call of this type is sometimes referred to as being sequentially dependent. If the values are passed in the wrong order, the function will either crash due to incompatible value types or an unintentional outcome will result. Additionally, many function syntaxes require that values be passed for all the parameters recognized in the function, even if those values are null or default values. When preparing function calls with such syntax, the human user has the burden of remembering all of the parameters and their types for each of the functions the user wishes to call. In the case of sequentially dependent functions, the user must additionally remember the order of the parameters. As such, the task of handling and instructing the computer to execute functions can be complicated and potentially fraught with errors.

The development of functions has traditionally been inflexible and required extensive coordination. As indicated earlier, functions are typically compiled into a program or a library. Once compiled, any modification or addition of functions requires recompilation. Therefore, it is very desirable to have a complete software package that will not need modification after compilation. This is particularly challenging when a team of software developers are each creating a series of functions since all of the developers must coordinate their efforts to develop the desired programs or libraries.

Therefore, there is a need for a method and apparatus which overcomes the problems in traditional function calls and their implementation.

SUMMARY OF THE INVENTION

Accordingly, an object of the invention is to provided flexible and generic method for implementing programs.

Another object of the invention is to provide a modular and extendable method and apparatus for executing and developing software.

Additional objects, advantages, and novel features of the invention will be set forth in part in the description that follows and in part will become apparent to those skilled in the art upon examining or practicing the invention. The objects and advantages of the invention may be realized and obtained by means of the instrumentalities and combinations particularly pointed out in the appended claims.

One embodiment of the present invention is a method in a computer system comprising the step of receiving a command having zero or more sequentially independent parameter values. The command corresponds to a program having a number of recognized parameters equal to or greater than the number of parameter values in the command. Next, the parameter values in the command are parsed based at least in part on demarcations in the command. Then, the parsed parameter values are associated with the corresponding parameters recognized in the program. Any recognized parameters in the program which did not have corresponding parameter values in the command are set to default values. The program is then executed to perform one or more tasks using the parameter values and the default values.

Another aspect of the invention is a computer readable medium comprising one or more function modules. Each function module has one or more functions that each have a plurality of instructions. The computer readable medium also comprises a map containing information for determining the correspondence between the function modules and the functions. A parser is adapted to receive a script command having zero or more parameter values and to parse the script command. The parser is further adapted to place the parsed command into a buffer. The computer readable medium also comprises a flow control module adapted to receive the buffer and determine from the map the function module having the function corresponding to the command. The flow control module is further adapted to pass the buffer to the corresponding function for execution of the instructions therein.

A further aspect of the invention is a method in the computer system involving the step of receiving a command having zero or more sequentially independent parameter tags with each parameter tag having an associated value set. The command is parsed based at least in part on demarcations in the command. Next, the parsed command is encapsulated into a buffer comprising the zero or more parameter tags and the associated value sets. The buffer is then passed to a function corresponding to the command, which is then processed.

Yet another aspect of the present invention is a computer system comprising a plurality of function modules each having one or more functions. All of the functions are able to receive a buffer of a predetermined type. A map has an index of the correspondence between functions and the function modules. A parser is adapted to receive a function call corresponding to one of the functions. The function call has zero or more parameter tags with associated value sets. The parser is further adapted to parse the function call and place the parsed function call into a buffer of the predetermined type. A flow control module is adapted to receive the buffer and reference the map to determine which function module has the function corresponding to the function call. The flow control module is further adapted to pass the buffer to the function for execution.

Still other aspects of the present invention will become apparent to those skilled in the art from the following description of a preferred embodiment, which is simply by way of illustration one of the best modes contemplated for carrying out the invention. As will be realized, the invention is capable of other different obvious aspects all without departing from the invention. Accordingly, the drawings and descriptions are illustrative in nature and not restrictive.

BRIEF DESCRIPTION OF THE DRAWINGS

The accompanying drawings, incorporated in and forming part of the specification, illustrate several aspects of the present invention and together with their description serve to explain the principles of the invention. In the drawings:

FIG. 4 shows a flowchart of the Read-Next-Function routine; and

FIG. 5 shows a flowchart of the Load-Client-Module routine.

Reference will now be made in detail to the present preferred embodiment of the invention, an example of which is illustrated in the accompanying drawings, wherein like numerals indicate the same elements throughout the views.

DETAILED DESCRIPTION

One embodiment of the present invention will be described as a method and apparatus for testing a distributed directory. However, one with ordinary skill in the art will readily appreciate that the present invention is a powerful, flexible, modular and extendable tool which can be implemented in a variety configurations and applications beyond this illustrative embodiment. To help understand this specific embodiment of the invention, the following several paragraphs provide some general information relating to computer networks and distributed directories.

Often, computers telecommunicate between each other and share information, applications and/or services. Sometimes in this setting, the various computers are referred to as nodes, which is a generic term referring to a point in a interconnected system. One type of computer network employs a client/server architecture, wherein the portions of network applications that interact with human users are typically separated from the portions of network applications that process requests and information. Usually, the portions of an application that interact with users or access network resources are called client applications or client software, and the portions of an application that process requests and information are called server applications or server software. Client machines tend to run client software and server machines tend to run server software, however a server can be a client as well.

Figure 1:
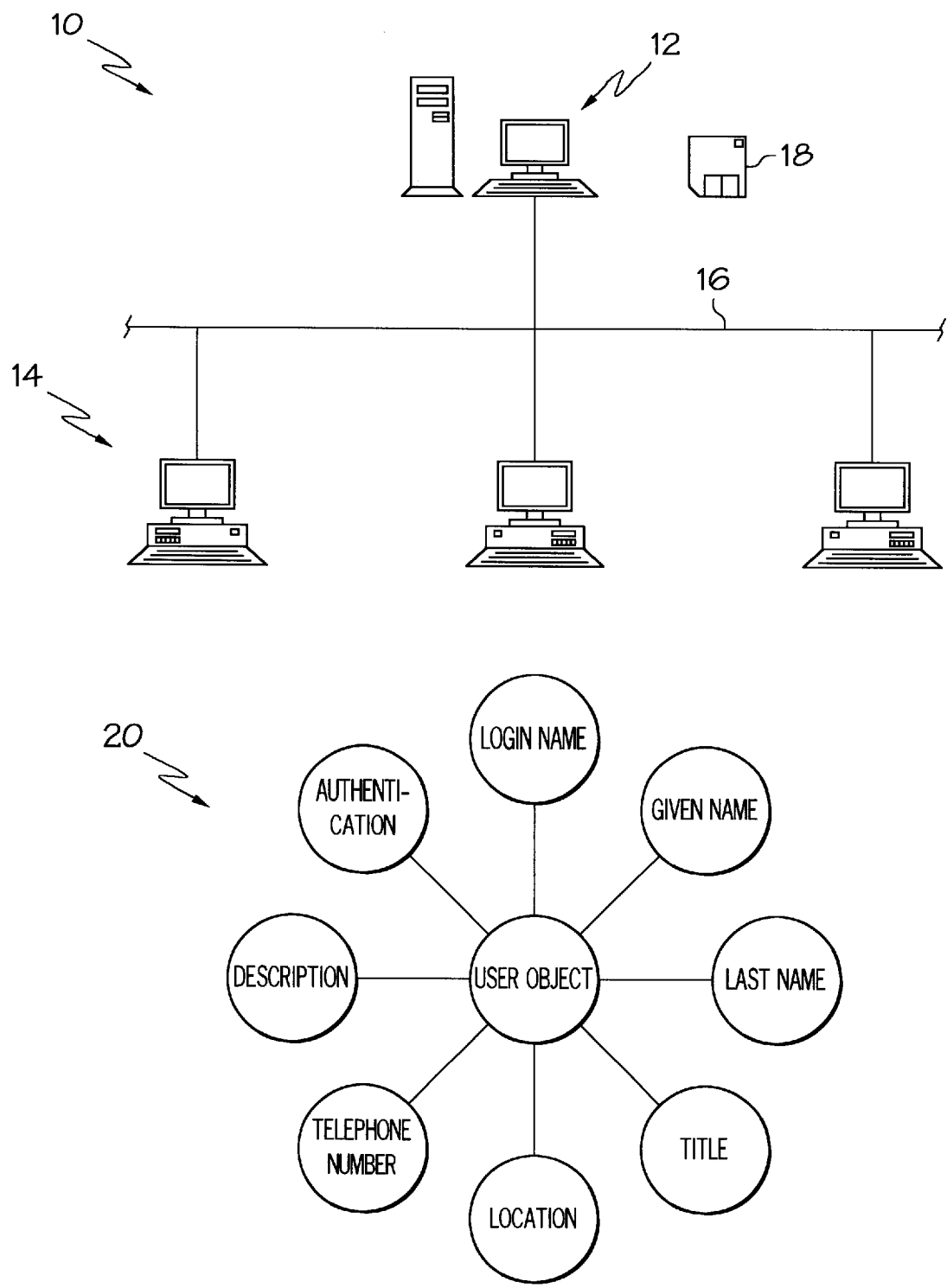
FIG. 1 shows a computer network and a typical directory object.

FIG. 1 illustrates a sample client/server network 10. As one with ordinary skill in the art will readily appreciate, a client/server network is only one type of network, and a variety of other configurations, such as peer-to-peer connections, are also considered computer networks. In a client/server network, a plurality of nodes are interconnected such that the various nodes send and/or receive information to/from one another. As shown here, a server node 12 is interconnected to a plurality of client nodes 14 using a connection 16 such as a token ring, ethernet, telephone modem connection, radio or microwave connection, or the like. A computer readable medium 18, shown here as a floppy diskette, holds information readable by a computer, such as programs, data, files, etc. As one with ordinary skill in the art will readily appreciate, computer readable medium can take a variety of forms, including magnetic storage (such as hard disk drives, floppy diskettes, etc.), optical storage (such as laser discs, compact discs, etc.), electronic storage (such as random access memory "RAM", read only memory "ROM", etc.), and the like.

One mechanism to maintain and access information across a network of interconnected nodes is a distributed directory, such as the X.500 network services protocol developed and published by the CCIT and Open Systems Interconnection Consortium. Usually in the context of a client/server network, a distributed directory spans and is shared by multiple networking server nodes, although a single server node can also maintain a distributed directory. While distributed directories are often used with client/server networks, they are not necessarily limited to the context of such networks. Information on the distributed directory can be created, read, modified, and shared by other nodes, such as client nodes or other server nodes, who have applicable access rights to the distributed directory.

The distributed directory contains a collection of objects, sometimes referred to as identities, with associated attributes or properties. For example, the object 20 is a user object that represents a human user. The object 20 has a variety of associated attributes, such as "Given Name", "Last Name", "Title", etc. Each associated attribute has a value. For example, the value for the property "Given Name" might be "George". Beyond representing users, objects in the distributed directory represent things that humans relate to when dealing with computers. For instance, some typical objects might represent printers, print queues, files, resources, computers, and the like. in addition, objects can represent non-computer related things such as countries, companies, organizations, departments, buildings, and the like. Furthermore, objects can be organizational in nature to group other objects together. As one with ordinary skill in the art will readily appreciate, objects can represent virtually anything, whether imaginary or real.

The structure of the distributed directory is often governed by a set of rules called the schema. The schema defines the rules for adding and managing objects and attributes of objects in the distributed directory. These rules are specified through a data dictionary that provides a standard set of data types from which objects can be created. Each object in the distributed directory belongs to an object class that specifies what attributes can be associated with the object. All attributes are based on a set of standard attribute types, which in turn are based on standard attribute syntaxes. The schema controls not only the structure of the individual objects, but also the relationship among the objects in the distributed directory. In controlling this relationship, the schema specifies subordination among object classes. That is, for every object there is a group of object classes from which subordinate objects can be formed. Objects that can contain other objects are called container objects, which are the building blocks of the distributed directory. Objects that cannot contain other objects are known as non-container or leaf objects.

In many cases, it is desirable to test a distributed directory to assure that it is operating correctly or to diagnose any problems that may be occurring in the distributed directory. For instance, testing during the initial installation of a distributed directory which spans a network of hundreds or thousands of computers will help assure that the distributed directory will work seamlessly. Testing often involves preparing a series of programs to perform tasks on the various computers or to manipulate information in the distributed directory. Testing programs are often developed by many software developers, who may or may not be working closely together, and usually require modifications or additions to conform to changing test specifications. Traditionally, testing software required all of the software developers to coordinate their efforts, with each modification of change requiring a total redesign and recompilation. The present invention provides a generic, consistent, modular, powerful and extensible tool for developing and executing programs for testing distributed directories.

Figure 2:
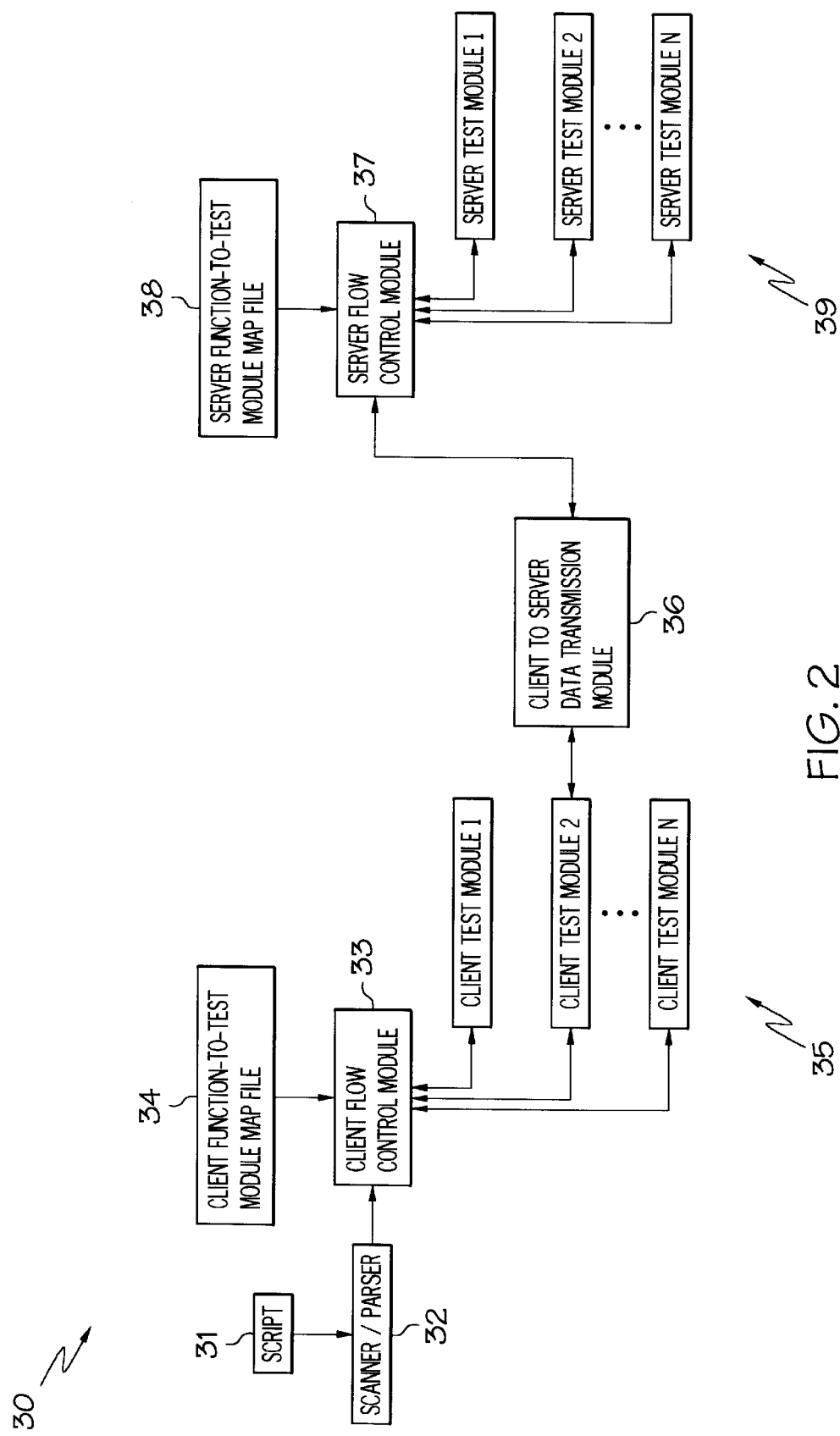
FIG. 2 shows a system embodying the present invention.

FIG. 2 depicts a system 30 which can be loaded into a computer readable medium. In this embodiment a script 31 contains one or more commands. Preferably, the command takes the form or one or more function calls corresponding to functions located in a function module. However, the command could also take a variety of other forms, such as a direction to run an executable file. The scanner/parser 32 receives the script 31, recognizes the command, and parses the command into its various components (if it has any components to be parsed). The parsed command is passed to the flow control module 33 which references the map 34 to determine which of the function module 35 contains the function corresponding to the command. If the corresponding function module 35 has not been loaded, the flow control module 33 will initiate the loading of the appropriate function module 35. Next, the parsed command is passed, preferably in an unmodified form, to the corresponding function for processing. Upon completion, control is returned to the flow control module 33.

If a function housed on a server is needed, the parsed command is sent through the transmission module 36 to the server flow control module 37. Like the client, the server flow control module 37 references a map 38 which indexes functions to the corresponding server function modules 39. The flow control module 37 passes the parsed command for processing to the appropriate module 39 and returns control to the client upon completion.

Figure 3:
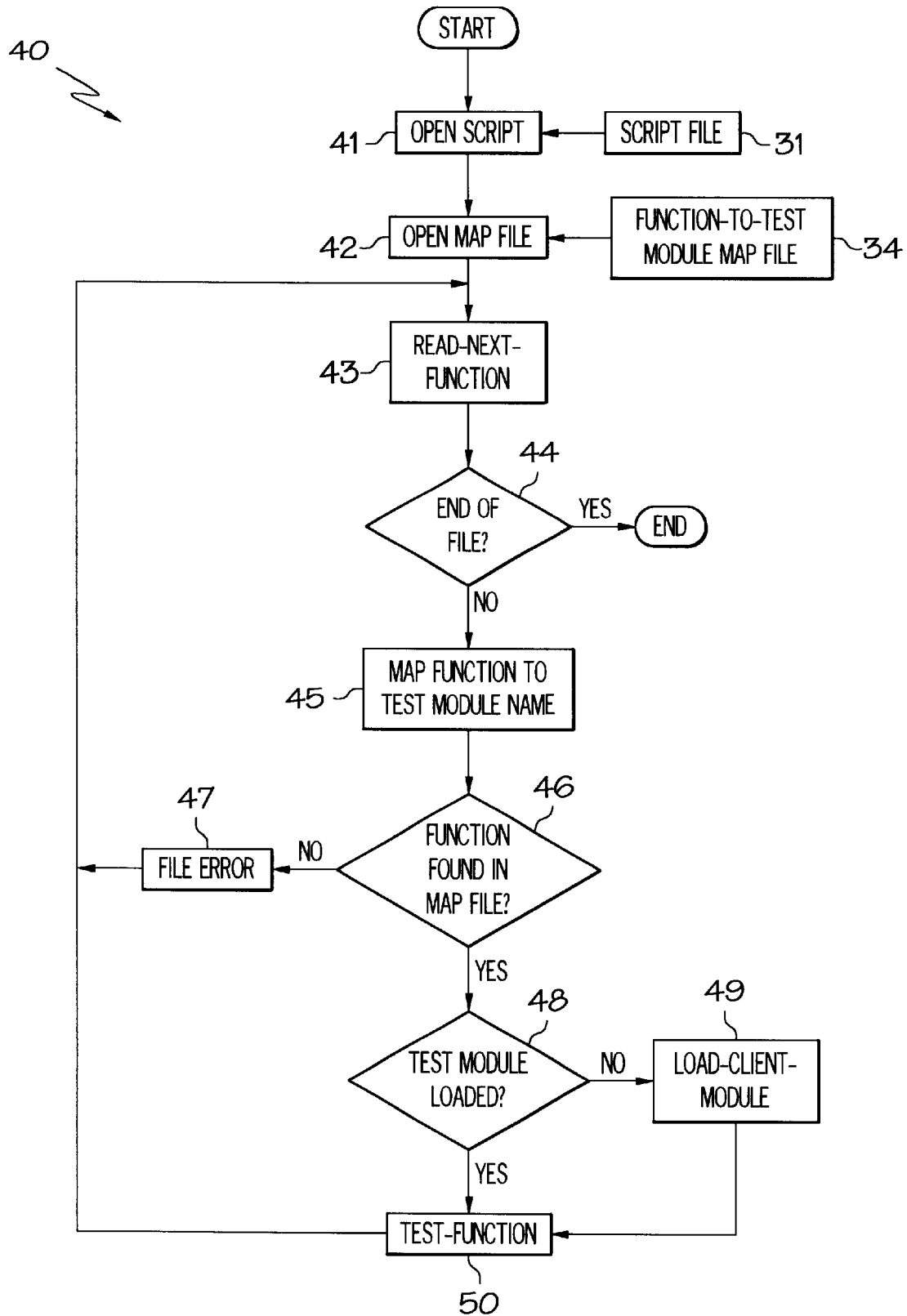
FIG. 3 shows a flow chart implementing the system of FIG. 2.

The flowchart 40 depicted in FIG. 3 illustrates the process performed by the scanner/parser 32 and the flow control module 33, which are sometimes collectively referred to as the test engine or the manager. In this embodiment, these two components 32, 33 are integrated into a single module in a computer system. Alternatively, however, each of these components could be encapsulated into separate modules. At step 41, the command is received by opening the script file 31. However, one with ordinary skill in the art will readily appreciate that commands can be received through a variety of other mechanisms.

Preferably, the script 31 is a text file which contains one or more commands or function calls. In this embodiment, each function call in the script 31 is represented according to a series of rules shown in the following modified BNF format.

Script-Function::=
   Function-Name(Parameter-Set);
Function-Name::=
   Alpha-numeric string up to 32 bytes.
Parameter-Set::=
   Parameter-Tag=Parameter-Value-Set; [Parameter-Set]
Parameter-Tag::=
   Alpha-numeric string up to 32 bytes.
Parameter-Value-Set::=
   [{] String-Value [, Parameter-Value-Set] [}]
String-Value::=
   Alpha-numeric string—no size limit In simple terms, the function call comprises three principle components: a Function-Name, zero or more Parameter-Tags, and a Value-Set corresponding to each Parameter-Tag. Preferably, these values will be defined by a separate test module writer. By providing these syntax rules for the script 31, the system 30 is generic so it can be used to implement a variety of different programs and functions.

The following script command, which comprises a single function call, illustrates the use of the foregoing rules:

Add-Object(Object-Name="CN=Joe.O=Novell";
     Attribute={"Object Class", "User"};
     Attribute={"Surname", "Brown"};
     HostSrvr="Server-One";
     ExpResult="OK";);

The Function-Name is Add-Object, the Parameter-Tags are Object-Name, Attribute, Attribute, HostSrvr and ExpResult, and the Value-Sets follow each of the Parameter-Tags. The function name corresponds to a function in a function module (e.g. a DLL, an NLM, etc.), a stand alone executable file, or the like. A variety of demarcations are used to separate the various components of the function call. For instance, the parameter list begins with an open parenthesis "(" and, ends with a closed parenthesis ")", and may contain zero or more parameter tags. The parameter values are placed to the right of the assign symbol "32 " and may comprise one or more elements separated by commas. Each value set is associated with the Parameter-Tag preceding it. This sample command is a call to the function Add-Object, which requests the addition of the object CN=Joe.O=Novell to the distributed directory. The function call also enters the value "user" to the attribute "Object Class" and the value "Brown" to the attribute "Surname". The function call will effect the change through Server-One, and the expected result is OK.

In step 42, the map 34 is opened to provide access to the information contained therein. The map 34 is an index having information about the correspondence between functions and the function modules. Preferable, the map is a text file which provides the advantages of easy modification and readability. In this embodiment, the map 34 lists each function followed by the corresponding function module, in the following general form:

Client-Function-Name 1. Client-Module-Name
   Client-Function-Name 2. Client-Module-Name Client-Function-Name refers to the function corresponding to the function call, and Client-Module-Name refers to the function module holding the function. An example map file follows:

Assign-Rights.ACC_CTL.DLL
   Delete-Rights.ACC_CTL.DLL
   Modify-Rights.ACC_CTL.DLL
   Add-Object.OBJ_CTR.DLL
   Remove-Object.OBJ_CTR.DLL When processing the earlier example of the function call Add-Object, the corresponding function module would be OBJ_CTR.DLL, a library of functions all generally related to object creation.

In step 43, the test engine begins a loop reading and processing each function call in the script 31. FIG. 4 depicts the actions taken in Read-Next-Function. At step 51, the script is read and the function name is ascertained from the function call. After the function name is read, a loop is started which will read and parse each of the parameter tags (if any exist) and the associated value sets based on the demarcations in the function call. The decision block 52 determines if any parameter tags remain unread. If all of the parameter tags have been read, the routine 43 returns. If an unread parameter tag remains, that tag is read in step 53. A similar loop in steps 54 and 55 reads all of the value sets based on the demarcations in the function call. The parameter tags and associated value sets are all entered into a buffer comprising of a link list of the parameter data. If the scanner/parser 32 and the flow control module 33 were separate encapsulated modules, the buffer would preferably include the function name. After all the parameter values have been read for a parameter tag, the routine loops back to step 52 until all of the parameter tags and associated value sets have been read and parsed.

Returning to FIG. 3, the routine proceeds to step 44 where if step 43 determined the end of the script file 31 has been reached, the routine will end. On the other hand, if a function call was read in step 43 the routine will proceed to step 45 where the function call is referenced in the map file 34. At decision block 46, if the function corresponding to the function call is not found in the map 34, a file error notice 47 results and the routine loops back to step 43 to read the next function call. If the corresponding function is found in the map 34, the corresponding function module is determined. At block 48, if the corresponding module is not already loaded into memory, the flow control module 33 loads the module into memory in step 49.

FIG. 5 depicts one way to achieve step 49. In step 61, a nonvolatile computer readable medium (e.g. a local hard disk) is searched for the corresponding function module. At decision block 62, if the module is not found, a file error 63 notice results and control is returned to routine 40. If inadequate RAM is determined from decision block 64, the least recently used function module is unloaded in step 65, and the routine loops back to block 64. Once adequate RAM becomes available, the corresponding function module is loaded into RAM in step 66, and control is returned to routine 40.

Returning to FIG. 3, if decision block 48 is positive or if the module was successfully loaded in step 49, the routine proceeds to step 50 where the function is bound and executed. The information in the buffer is passed, preferably in an unmodified form, to the function corresponding to the function call for the execution of the instructions therein. It is preferred that each of the various functions listed in the map can receive the same type of buffer to make the system 30 generic. Step 50 represents only the generic part for the function. Preferably, each of the various functions are wholly independent from each other, allowing them to be created and modified simultaneously and separately with no cross-over effects. After the function is finished executing, control is returned to the routine 40, which loops back to step 43 until all the function calls in the script 31 have been processed.

Preferably, the parameter tags in the script are sequentially independent. In other words, the function will work regardless of the order of the parameter tags listed in the function call. Such a feature breaks from the traditional syntax of function calls and commands, which generally require the parameter values to be presented in a rigid sequential order. As a further preferred aspect, the function call need not necessarily provide any or all of the parameters recognized in the function. While some functions have no recognized parameters, many functions have a plurality of recognized parameters. Ideally, the function call would include parameter values for between zero and all of the parameters recognized in the function. Doing so would allow users to call functions with values for only those parameters of interest. Traditionally, function calls would be required to provide values for all of the recognized parameters, even if those values are null or default values. One or both of the foregoing preferred embodiments would result in increased flexibility and a more forgiving syntax, which would simplify and ease the use of the system.

To implement these preferred embodiments, the parameter values in the command should be associated with the corresponding parameters recognized in the function. While this association could be achieved in the flow control module by referencing a more detailed map file, it is preferred that this association is achieved internally within the function. The function will receive the buffer containing the linked list of parameters, and will reference the parameter tags in the list to assign the recognized parameters with the corresponding value sets. The following code segment of the function VERBAddEntry illustrates one way to achieve the foregoing association, which can be readily modified or built upon using well known programming languages and techniques:

```
// ******************************************
// VERBAddEntry
// ******************************************
int VERBAddEntry(ParmList *DSEParm)
{   int             rc, inc0, inc1, expRes;
    char            *memblock, *sendBuf, *recBuf, *cur, *base, *limit, *cStr, *tStr;
    char            *objPtr, *parentPtr, *nStr, *ExpResult=NULL;
    uint32          EntryID, Syntax, *Len, *DropFlag=NULL, *Version=NULL,
                    *Flags=NULL;
    unicode         *pStr, *uStr;
    char            *Parms[200], *ValPtr, *AttrPtr, *pinput, *attrBuf;
    int             ParmTot, ValCnt=0, AttrCnt=0, ParmCnt, Size;
    void            *UniRuleHndl;
    UNI_STRING      *ObjName=NULL, *HostSrvr=NULL;
    unsigned        actualOutSize;
    NWCFrag         sendBlock[1], recBlock[1];
    bool            MoreAttrs=true, Found;
```

-continued

```
memblock     = (char *)DSEMalloc((BUFFER_SIZE*3)+ ((MAX_DN_BYTES+2)*5));
if(!memblock) { rc = ERR_NOMEM; goto EndProc; }
sendBuf      = memblock;
recBuf       = sendBuf + BUFFER_SIZE;
attrBuf      = recBuf + BUFFER_SIZE;
cSt          = attrBuf + BUFFER_SIZE;
nStr         = cStr + MAX_DN_BYTES+2;
tStr         = nStr + MAX_DN_BYTES+2;
pStr         = (unicode *)(tStr + MAX_DN_BYTES+2);
uStr         = (unicode *)(tStr + ((MAX_DN_BYTES+2)*2));
// The "PullTag" function is the mechanism used to get parameter tags
// and values out of the buffer. Note that the question asked is
// "Do you have a <parameter tag>?" rather than "What tags do you
// have?" It is assumed that the test module knows what tags it
// needs. The following three tags are mandatory, as noted by the
// return code signaling a move to EndProc should the tags not be
// found.
if ( (rc = PullTag(DSEParm, "HostSrvr", TYP_UNICODE,(void**)&HostSrvr))
   ||(rc=PullTag(DSEParm, "ObjName", TYP_UNICODE, (void**)&ObjName))
   ||(rc=PullTag(DSEParm, "ExpResult", TYP_STR, (void**)&ExpResult))
  ) goto EndProc;
// The following three tags are optional. In their absence, default
// values will be used. This greatly adds to script readability by
// cutting down redundant or unnecessary parameters.
PullTag(DSEParm, "DropFlag", TYP_ULONG, (void**)&DropFlag);
PullTag(DSEParm, "Version", TYP_ULONG, (void**)&Version);
PullTag(DSEParm, "Flags", TYP_ULONG, (void**)&Flags);
DSEPrint("~COVERBAddEntry: ~C1%U\n", ObjName);
expRes = SetExpResult(ExpResult);
parentPtr = strchr((char *)(ObjName—>Data),'.')+1;
*(parentPtr-1) = 0x00;
objPtr = ObjName—>Data;
strcpy(nStr, objPtr);
base = cur = (char *)sendBlock[0].pAddr = sendBuf;
limit = base + BUFFER_SIZE;
if(    (rc = NWDSResolveName( *nContext, "[Root]", &conn, &EntryID))
   ||(rc = NWGetLocalToUnicodeHandle(&UniRuleHndl))
   ||(rc = WPutInt32(&cur, limit, 0))      // Version
   ||(rc = WPutInt32(&cur, limit, 0))      // Flags
   ||(rc = NWLocalToUnicode(UniRuleHndl, uStr, MAX_DN_BYTES,
        (unsigned char *)parentPtr, ' ', &actualOutSize))
   ||(rc = GetEntryID(uStr, &EntryID))
   ||(rc = WPutInt32(&cur, limit, EntryID)) // EntryID of Parent
   ||(rc = GetPartition(EntryID, pStr))
   ||(rc = NWLocalToUnicode(UniRuleHndl, uStr, MAX_DN_BYTES,
        (unsigned char *)objPtr, ' ', &actualOutSize))
   ||(rc = WPutString(&cur, limit, uStr))    // RDN of attr
   ||(rc = WPutAlign32(&cur, limit, base))
   ||(rc = WSkipInt32(&cur, limit, &AttrPtr)) // Fill in AttrCount when known
  ) gotoEndProc;
// The following loop checks for multiple occurrences of the parameter
// tag "Attribute".
    for(;MoreAttrs;)
    { if( (rc=DSEParam—>SearchTag("Attribute", &ValCnt)))
        { MoreAttrs=false;
          rc=0;
        }
        else
        { AttrCntr++;
          ParmTot=0;
        pInput=attrBuf;
        memset(Parms, 0x00, sizeof(Parms));
        // Pull attrname and values for this attr
        for(inc1=0;inc1<ValCnt;inc1++)
            { if( (rc=DSEParm—>ComputValueSize(&Size))
                ||(rc=DSEParm—>ReadValue(pInput))
               ) goto EndProc;
               Parms[ParmTot++] = pInput;
               pInput += Size+5;
            }
        // Stick in the Attr name
        if( (rc = NWLocalToUnicode(UniRuleHndl, uStr, MAX_DN_BYTES,
                (unsigned char *)Parms[0], ' ', &acualOutSize))
           ||(rc = WPutALign32(&cur, limit, base))
           ||(rc = WPutString(&cur, limit, uStr))
           ||(rc = WPutAlign32(&cur, limit, base))
           ||(rc = WSkipInt32(&cur, limit, &ValPtr)) // Fill ValCount later
          ) gotoEndProc;
        // Get Syntax. Check to see if it is MetaSchema
```

-continued

```
        for(Found=flase, inc0=0; !Found && (inc0 < sizeof(MetaSchema)
                /sizeof(MetaSchema[0])); inc0++)
            if (!strcmp(MetaSchema[inc0].Name, Parms[0])) { Found = true;
                Syntax = MetaSchema[inc0].Syntax; }
        if(!Found) rc = GetSyntax(uStr, &Syntax);
        // Now Add the Values
        for(ValCnt=0,ParmCnt=1;ParmCnt<ParmTot;)
            { ValCnt++;
            if( (rc = WPutAlign32(&cur, limit, base))
                ||(rc = PushValue(&cur, limit, base, Syntax, Parms, &ParmCnt))
            ) goto EndProc;
            }
        // fix up ValCnt
            Len = (uint32 *)ValPtr;
            *Len = ValCnt;
        } // end else
        } // end for
    // fix up AttrCnt
    Len = (uint32 *)AttrPtr;
    // mess up the packet for bad packet testing
    if(DropFlag && *DropFlag)
        *Len = AttrCnt+1;
        else
        *Len = AttrCnt;
    sendBlock[0].uLen = cur - base;
    recBlock[0].uLen = BUFFER_SIZE;
    recBlock[0].pAddr = recBuf;
    if(!rc)
        do
        rc = NWCFragmentRequest(conn, DSV_ADD_ENTRY, 1, sendBlock, 1, recBlock,
                    &actualOutSize);
        while(Retry(&rc, expRes));
EndProc:
    if(rc) DSEError(rc, "VERBAddEntry");
    if(memblock) DSEFree(memblock);
    if(ExpResult) DSEFree(ExpResult); if(DropFlag)    DSEFree(DropFlag);
    if(Version)   DSEFree(Version);
    if(HostSrvr) { DSEFree(HostSrvr—>Data); DSEFree(HostSrvr); }
    if(ObjName) { DSEFree(ObjName—>Data); DSEFree(ObjName); }
    return rc;
} // end VERBAddEntry
```

The following example helps illustrate the flexibility, modularity, and extendibility of the present invention. Suppose three software engineers, ENG 1, ENG 2, and ENG 3 are assigned to provide automated test functionality for distributed directories on three separate projects: ENG 1 is assigned to access control, ENG 2 to object creation, and ENG 3 to partitioning operations. ENG 1 decides the following access control-specific test functions are needed:

Assign-Rights
Modify-Rights
Delete-Rights
Remove-Object
Add-Object

The functions Remove-Object and Add-Object are not access control-specific, but are needed to set up test objects. ENG 1 can choose to create these functions or to use the similar functions already created by ENG 2. For this example, assume ENG 1 chooses to create new functions.

ENG 2 decides the following creation-specific test functions are needed and creates the same:

Add-Object
Remove-Object
Read-Object
List-Object

ENG 3 decides the following partition-specific test functions are needed:

Add-Replica
Create-New-Partition
Add-Object
Remove-Replica
Remove-Existing-Partition
Remove-Object The functions Add-Object and Remove-Object are required to populate a distributed directory with various types of objects. ENG 3 could to recreate these functions or to use the similar functions created by ENG 2. Assume ENG 3 chooses to use the existing functions.

ENG 1 and ENG 2 create their respective functions independently, placing them in newly-formed function modules ACC_CTL.DLL and OBJ_CRT.DLL, respectively. Compilation of these modules are independent and require no knowledge of the other. ENG 1 adds entries for the access control functions in the Function-To-Test Module Map File as follows:

Assign-Rights.ACC_CTL.DLL
Delete-Rights.ACC_CTL.DLL
Modify-Rights.ACC_CTL.DLL
Add-Object.ACC_CTL.DLL
Remove-Object.ACC_CTL.DLL Likewise, ENG 2 adds entries for the object creation functions in the same Function-To-Test Module Map File, as shown in italics:

Assign-Rights.ACC_CTL.DLL
Delete-Rights.ACC_CTL.DLL
Modify-Rights.ACC_CTL.DLL

Add-Object.ACC_CTL.DLL
Remove-Object.ACC_CTL.DLL
Read-Object. OBJ_CRT.DLL
List-Object. OBJ_CTR.DLL ENG 2 notices that the functions Add-Object and Remove-Object already exist. Because function names in this embodiment must be unique in the map file, ENG 2 changes the function names to something unique. ENG 2 chooses OBJ_Add-Object and OBJ_Remove-Object, and adds them to the Map File as shown in italics:

Assign-Rights.ACC_CTL.DLL
Delete-Rights.ACC_CTL.DLL
Modify-Rights.ACC_CTL.DLL
Add-Object.ACC_CTL.DLL
Remove-Object.ACC_CTL.DLL
Read-Object.OBJ_CRT.DLL
List-Object.OBJ_CRT.DLL
OBJ_Add-Object.OBJ_CRT.DLL
OBJ_Remove-Object.OBJ_CRT.DLL ENG 3 creates the function module PART.DLL to house the partitioning test functions. As before, compilation of this DLL requires no knowledge of any other DLLs. ENG 3 adds entries for these functions in the Function-To-Test Module Map File as shown in italics:

Assign-Rights.ACC_CTL.DLL
Delete-Rights.ACC_CTL.DLL
Modify-Rights.ACC_CTL.DLL
Add-Object.ACC_CTL.DLL
Remove-Object.ACC_CTL.DLL
Read-Object.OBJ_CRT.DLL
List-Object.OBJ_CRT.DLL
OBJ_Add-Object.OBJ_CRT.DLL
OBJ_Remove-Object.OBJ_CRT.DLL
Add-Replica.PART.DLL
Remove-Replica.PART.DLL
Create-New-Partition.PART.DLL
Remove-Existing-Partition.PART.DLL Now, anyone of the three engineers can use any of the several functions. For instance, ENG 3 can simply provide the script writer with information regarding OBJ_Add-Object and OBJ_Remove-Object as designed by ENG 2. Notice that successfully adding the new functionality in no way required knowledge about the scanner, parser, or flow control modules. The function modules and the test engine are truly independent from each other. This example also shows that similar functionality can be developed and added provided that the function names are unique. Moreover, software developers may or may not work together and do not have to coordinate their efforts to compile their software. The various components are modular, and as such functionality is extendable since new function modules can be added or existing modules can be modified, without having to recompile or reference the other modules.

The next example illustrates the invention being used in a client/server context. Consider the following script command on a client machine:

Add-Object-Server(Object-Name="CN=Joe.O=Novell";
    Attribute={"Object Class", "User"};
    Attribute={"Surname", "Brown"};
    HostSrvr="Server-One";
    ExpResult="OK";);

This function call to Add-Object-Server attempts to add the object CN=Joe.O=Novell to the distributed directory, giving it two attributes. It is to effect the change through a test module located on Server-One, and the expected result is OK. The parser recognizes that Add-Object-Server is a function name and prepares to parse its parameters using the various demarcations. The first parameter tag is Attnbute. Its parameter values are Object Class and User. These parameter values are kept in order and are associated with Attnbute. The second parameter tag is Attribute and has the values Surname and Brown associated with it. The third tag is HostSrvr, having its value as Server-One. The last parameter is ExpResult, with its value of OK. The parsed parameter tags and the associated value sets are then placed in a buffer.

Next, the Function-To-Test Module Map File is searched for the function Add-Object-Server. Suppose the following entry was found in the file: Add-Object-Server.OBJ_CRT.DLL. As such, the module OBJ_CRT.DLL holds the test function Add-Object-Server. Suppose this module is not loaded, so the test engine checks to see if sufficient RAM exists to load OBJ_CRT.DLL. Assume there is enough memory and that the module is successfully loaded.

The buffer containing the parameter tag and value sets is passed to Add-Object-Server. This function takes the buffer and builds a server-packet by placing the components in a separate server buffer. For purposes here, the attribute values are placed in the same order listed in the function call, except that the HostSrvr is placed first (i.e. HostSrvr, Object-Name, Attribute, Attribute, ExpResult). This packet also notes the name of the server test function on the server to be executed, which is defined within the client function. In this example, assume the server test function is SRV-ADD-OBJECT.

A connection is made between the client and HostSrvr. The rest of the packet is bundled and sent the Server-Main-Function on HostSrvr. When HostSrvr returns control to the client, Server-Encapsulation-Function will write out any messages to Print-Function. The function SRV-ADD-OBJECT is searched for in HostSrvr's Function-To-Test Module Map File. Suppose the following entry was found in the file: SRV-ADD-OBJECT.OBJ_CRT.NLM. As such, the function module OBJ_CRT.NLM holds the test functionality for SRV-ADD-OBJECT Suppose this module is not loaded. The server checks to see if sufficient RAM exists to successfully load OBJ_CRT.NLM. Assuming there is enough memory, the module is then loaded. The server buffer is then passed to SRV-ADD-OBJECTfor execution. Any messages or results are passed back to the calling client function and eventually to the client for display.

The foregoing description of the preferred embodiment of the invention has been presented for purposes of illustration and description. It is not intended to be exhaustive nor to limit the invention to the precise form disclosed Many alternatives, modifications and variations will be apparent to those skilled in the art in light of the above teaching. For instance, the invention has utility beyond testing software. Additionally, the invention has utility in non-distributed systems. Accordingly, this invention is intended to embrace all such alternatives, modifications and variations that fall within the spirit and broad scope of the appended claims and their equivalents.

What is claimed is:

1. A computer readable medium, comprising:
    a) a plurality of function modules, each function module having one or more functions, each function having a plurality of instructions for manipulating information in a distributed directory;

b) a map file containing information for determining the location of the function modules which are loaded into a memory on a computing device and which have the functions at a runtime;

c) a parser adapted to receive a script command having zero or more order independent parameter values and parse the script command, said parser being further adapted to place the parsed command into a buffer; and d) a flow control module adapted to receive the buffer and determine from the map file the function module having the function corresponding to the command, said flow control module being further adapted to pass the buffer to the corresponding function for execution of the instructions therein with any parameter values organized in an order required by the function.

2. A computer readable medium as recited in claim 1, wherein the script command has zero or more parameter tags with each tag having an associated value set.

3. A computer readable medium as recited in claim 2, wherein the buffer is a linked list comprising the parameter tags and the associated values.

4. A computer readable medium as recited in claim 2, wherein parameter tags in the script command are sequentially independent.

5. A computer readable medium as recited in claim 2, wherein the script command has less than the number of parameters recognized by the corresponding function.

6. A computer readable medium as recited in claim 1, wherein the buffer is of a predetermined type which each of the one or more functions can receive.

7. A computer readable medium as recited in claim 1, wherein at least one of the function modules is a DLL or an NLM.

8. A computer readable medium as recited in claim 1, wherein the flow control module is further adapted to load the corresponding function if the function is not already loaded.

9. A computer readable medium as recited in claim 1, wherein the corresponding function is adapted to associate the one or more parameter values to the corresponding parameters recognized by the function.

10. A computer system comprising the computer readable medium recited in claim 1.

11. A method for testing a distributed directory, comprising the steps of:

a) receiving a test command having zero or more order independent parameter tags with each parameter tag having a parameter name and an associated value;

b) parsing the command based at least in part on demarcations in the command;

c) using a map file to bind at a runtime a software module which corresponds to the command and contains instructions for testing the distributed directory;

d) encapsulating the parsed command into a buffer comprising the zero or more parameter tags and the associated values;

e) passing the information in the buffer to the software module corresponding to the command; and f) executing the instructions in accordance with the information passed in the buffer.

12. A method as recited in claim 11, wherein the command is received as a script.

13. A method as recited in claim 11, further comprising the step of determining from a map the software module corresponding to the command.

14. A method as recited in claim 13, further comprising the step determining whether the software module has been loaded, and if the software module has not been loaded then loading the software module.

15. A method as recited in claim 11, wherein the number of parameter tags in the command is less than or equal to the number of parameters recognized by the corresponding instructions in the software module.

16. A method as recited in claim 11, wherein the step of processing involves associating the value sets to the corresponding parameters in the software module.

17. A computer readable medium comprising software capable of performing the method of claim 11.

18. A computer system capable of performing the method of claim 11.

19. A distributed directory operating on a network of computers, comprising:

a) a plurality of function modules each having one or more functions adapted to modify information in the distributed directory all being able to receive a buffer of a predetermined type;

b) a map file having an index of the correspondence between the functions and the function modules;

c) a parser adapted to receive a function call corresponding to one of said functions, said function call having zero or more order independent parameter tags with associated values, said parser being further adapted to parse the function call and to place the parsed function call into a buffer with the parameter tags in ordered sequence; and d) a flow control module adapted to receive the buffer and reference the map to determine which function module has the function corresponding to the function call at a runtime, said flow control module being further adapted to pass the data in the buffer to the corresponding function for execution.

20. A distributed directory as recited in claim 19, wherein the buffer is a linked list comprising the parameter tags and the associated value sets.

21. A distributed directory as recited in claim 19, wherein the parameter tags in the function call are sequentially independent.

22. A distributed directory as recited in claim 19, wherein the number of parameter tags in the function call is less than or equal to the number of parameters recognized by the corresponding function.

23. A distributed directory as recited in claim 19, wherein the corresponding function is adapted to associate the value sets to the corresponding parameters recognized by the function.

24. A distributed directory as recited in claim 19, wherein the one or more functions provide functionality to test the distributed directory.

25. A method for testing a distributed directory, comprising the steps of:

a) developing a plurality of functions, each function comprising a series of instructions for manipulating information in a distributed directory;

b) storing the plurality of functions in a plurality of function modules, each function module having one or more functions;

c) indexing each of the plurality of functions to a corresponding function module at a runtime;

d) creating a script having a plurality of function calls for testing the distributed directory, each function call corresponding to a function;

e) receiving the script;
f) parsing the script and separating zero or more parameter tags for each function call where the pre-parsed parameter tags are order independent;
g) passing each function call to the function module having the function corresponding to the function call and having the parameter tags needed by the function call in an order required by the function call; and
h) executing the instructions of the function corresponding to each function call.

26. The method of claim 25, wherein at least one function call in the script includes one or more parameter tags and associated value sets.

27. The method of claim 25, further comprising after step (c) the step of storing on a computer readable medium the correspondence between the functions and the function modules.

28. The method of claim 25, wherein the steps are performed sequentially as listed.

* * * * *